(12) United States Patent
Weidinger et al.

(10) Patent No.: US 10,790,880 B2
(45) Date of Patent: Sep. 29, 2020

(54) METHOD OF OPERATING AN NFC DEVICE, THE NFC DEVICE, AND A COMMUNICATION SYSTEM

(71) Applicant: NXP B.V., Eindhoven (NL)

(72) Inventors: Christian Weidinger, Graz (AT); Navdeep Kaur, Bangalore (IN); Sanjay Kumar, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/680,925

(22) Filed: Nov. 12, 2019

(65) Prior Publication Data

US 2020/0169294 A1 May 28, 2020

(30) Foreign Application Priority Data

Nov. 23, 2018 (EP) .................................... 18208010

(51) Int. Cl.
*H04B 5/00* (2006.01)
*H04W 4/80* (2018.01)
(Continued)

(52) U.S. Cl.
CPC ..... *H04B 5/0031* (2013.01); *G06K 19/07309* (2013.01); *G06Q 20/347* (2013.01); *H04W 4/80* (2018.02)

(58) Field of Classification Search
CPC ..... G06Q 20/347; G06Q 20/357; H04W 4/80; G06K 19/07309; H04B 5/0031; H04B 5/00; H04B 5/02
See application file for complete search history.

(56) References Cited

U.S. PATENT DOCUMENTS

| 8,362,881 B2 | 1/2013 | Gallo et al. |
| 8,395,488 B2 | 3/2013 | Gallo et al. |

(Continued)

FOREIGN PATENT DOCUMENTS

| EP | 2913973 A1 | 9/2015 |
| KR | 20070012366 A | 1/2007 |
| WO | WO-2016138194 A1 | 9/2016 |

OTHER PUBLICATIONS

Anonymous, "Virtual memory;" Wikipedia, Oct. 20, 2018, retrieved from the Internet at https://en.wikipedia.org/w/index.php?t itle=Virtual memory&oldid=864864520 on Feb. 8, 2019.

(Continued)

*Primary Examiner* — Nhan T Le

(57) ABSTRACT

A method for operating a first near field communication, NFC, device, wherein the NFC device comprises an NFC interface and a memory, the method comprising: i) receiving a request for a service from a second NFC device at the NFC interface, ii) allocating a first information from a first memory unit of the memory that is configured to take part in providing the service, iii) allocating a second information from a second memory unit that is not configured to take part in providing the service, and transferring the second information from the second memory unit to the first memory unit, hereby iv) transferring at least a part of the first information and/or at least a part of the second information virtually beyond the first memory unit, v) combining the first information and the second information into a message, and vi) providing the message to the second NFC device as a response to the request.

15 Claims, 5 Drawing Sheets

(51) Int. Cl.
*G06K 19/073* (2006.01)
*G06Q 20/34* (2012.01)

(56) References Cited

U.S. PATENT DOCUMENTS

| | | |
|---|---|---|
| 8,429,375 B1 | 4/2013 | Pollack et al. |
| 8,706,036 B2 | 4/2014 | Bukovjan et al. |
| 8,750,514 B2 | 6/2014 | Gallo et al. |
| 8,942,626 B2* | 1/2015 | Cho .................. H04W 76/14 |
| | | 455/41.1 |
| 9,119,069 B1* | 8/2015 | Vipond ............... H04W 12/06 |
| 9,749,953 B2* | 8/2017 | Seo ................... H04W 52/028 |
| 10,379,731 B2* | 8/2019 | Choi ................... G06F 3/0482 |
| 2008/0231428 A1 | 9/2008 | Kuhl |
| 2014/0236697 A1 | 8/2014 | Seo et al. |
| 2014/0357187 A1 | 12/2014 | Ehrensvard |
| 2015/0371453 A1 | 12/2015 | Gallo et al. |
| 2018/0097797 A1 | 4/2018 | Hoyer et al. |

OTHER PUBLICATIONS

Langer, Josef et al., "Anwendungen and Technik von Near Field Communication (NFC);" Sep. 9, 2010; pp. 112-113; DOI: 10.1007/978-3-642-05497-6; with Google Translation from German to English.

NFC Forum, "NFC Data Exchange Format (NDEF) Technical Specification NFC Forum;" Jul. 24, 2006; NFC Forum, Inc., Wakefield, MA, USA.

Roland, Michael et al., "Security Vulnerabilities of the NDEF Signature Record Type", 2011 Third International Workshop on Near Field Communication, Feb. 22, 2011, pp. 65-70, IEEE, Piscataway, NJ, USA.

* cited by examiner

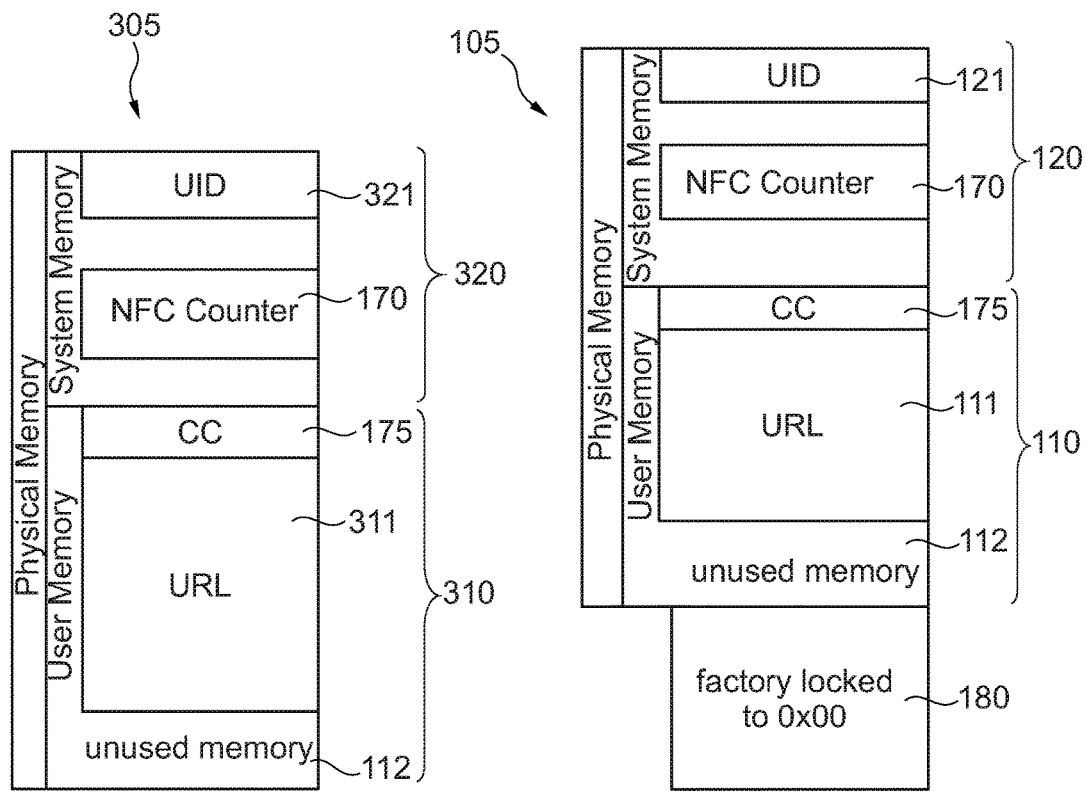
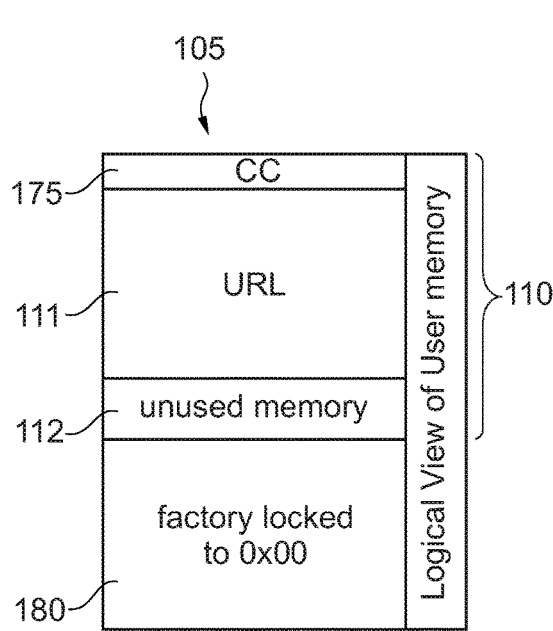
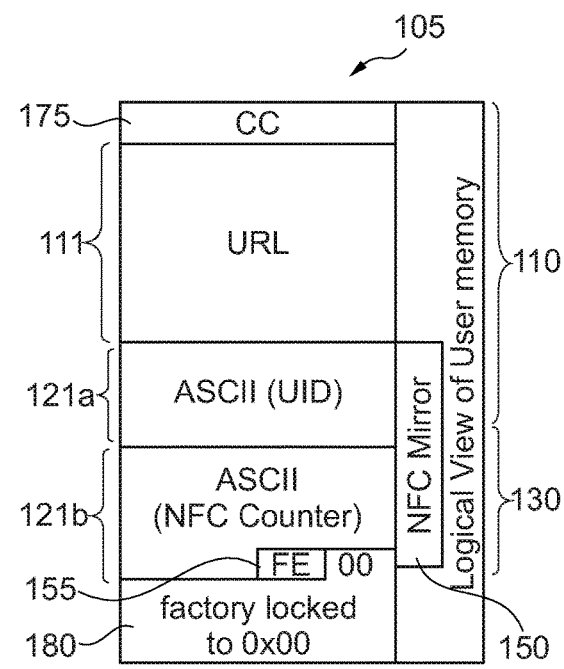
Fig. 3a -Prior art-
Fig. 3b
Fig. 3c
Fig. 3d

METHOD OF OPERATING AN NFC DEVICE, THE NFC DEVICE, AND A COMMUNICATION SYSTEM

CROSS-REFERENCE TO RELATED APPLICATIONS

This application claims priority under 35 U.S.C. § 119 to European Patent Application No. 18208010.1, filed on Nov. 23, 2018, the contents of which are incorporated by reference herein.

FIELD OF THE INVENTION

The invention relates to a method of operating an NFC device, the NFC device, and a communication system.

BACKGROUND OF THE INVENTION

Near field communication (NFC) is widely used in a variety of applications including, for example, smartphones, and similar devices including Radio Frequency Identification (RFID), to establish radio communication with each other by touching them together or bringing them into close proximity, for example within a short distance such as a few to several centimeters or inches. Applications include, among others, contactless transactions, data exchange, and simplified setup of more complex communications such as Wi-Fi or bluetooth. Various other types of communication applications include those between an NFC device such as an NFC mobile phone and another NFC device such as an NFC chip, called a "tag". Some of the applications involving identification products such as smart cards and RFID tags are used in endeavors such as transport (e.g., ticketing, road tolling, baggage tagging), finance (e.g., debit and credit cards, electronic purse, merchant card), communications (e.g., SIM card for GSM phone), and tracking (e.g., access control, inventory management, asset tracking). The international standard ISO/IEC 14443 is the industry standard for contactless smart cards, and the communication protocols associated therewith. ISO 15693 is another relevant NFC Forum standard (in particular with respect to Tag Type 5). Standard-compliant products provide RF-communication technology for transmitting data between a card or tag and a reader device. For example, in electronic ticketing for public transport, travelers can wave a smart card over a reader at the turnstiles or entry point, benefiting from improved convenience and speed in the ticketing process. Such products can be important to individual mobility, and can support multiple applications such as road tolling, airline tickets, and access control. An example of such an NFC system is provided in U.S. Pat. No. 8,706,036 B2.

In particular small NFC devices such as RFID tags can be applied in a versatile and feasible manner for many applications. For example, a tag can be attached to a poster (so-called smart poster) and a user can directly follow a link to a website of the provider of the poster by establishing an NFC contact between an NFC reader device and the RFID tag.

Many other applications are possible in which a user approaches a small NFC device with his/her own NFC device (such as a mobile phone) and requests a service from the smaller NFC device. Hereby, the NFC tag may receive the request for the service (e.g. a link to a website) and provide the link via an NFC connection to the NFC mobile phone, for example as an NDEF message. For this purpose, the web address has to be saved in a memory space of the tag. Further important information such as a serialization information of the tag are generally also contained in the NDEF message.

However, memory space is an issue in NFC devices, such as tags, because these devices are generally produced in a cost-efficient manner and in high numbers. Hence, a large and/or complex memory in an NFC device, such as a tag, would lead to undesired costs and hamper the production workflow.

FIG. 3a shows an example of a memory configuration of an NFC tag from the prior art. The physical memory 305 comprises a user memory 310 that is normally configured to take part in providing a service. In the user memory 310, a web address (URL) 311 for being provided in an NDEF message can be saved. The user memory 310 further comprises a capability container (CC) 175 to store e.g. status information such as the size of the memory. The user memory 310 comprises a limited unused memory space 112 that is not occupied by the URL, and wherein further data could be stored. The physical memory 305 further comprises a system memory 320 that is normally not configured to take part in providing a service. In other words, the system memory 320 is an internal memory that is not allocated for NFC usage. The system memory 320 comprises a UID 321 and/or a counter 170. In case that a message should be created by the NFC tag, the system memory 320 can transfer the UID 321 and/or the counter value 170 to the unused memory 112 of the user memory 310 such that the URL and the UID/counter value can be combined into one message.

FIGS. 4a and 4b show examples from the prior art of operating a tag in order to provide a web address (URL) together with a unique identification (UID) of the tag, both together, in form of an NDEF message to another device.

FIG. 4a: in this example, the URL 411 is short and fits well into an unused space of the user memory 410. In the Figure, the URL is shown as blocks entitled "NDEF plus number". The system memory 420 furthermore stores the UID 421 in hexadecimal format. The UID 421 is shown as blocks entitled "mirror plus number". All blocks and the terminator TLV 155 fit into the user memory space 410. Upon receiving a request for providing an NDEF message, an NFC mirror 150 mirrors the UID 421 from a system memory 420 into the unused space of the user memory 410 and hereby converts the UID from hexadecimal in ASCII format. ASCII formats requires the double memory space compared to the hexadecimal format. Then URL 411 and mirrored UID 421 are combined into the NDEF message 460. In other words, in order to read the complete data, a user has to configure an address such that an NFC mirror boundary fits within the allocated memory area 410. As shown in the Figure, the complete URL 411 is read by configuring a correct mirror start address.

FIG. 4b: in this example, however, the URL 411 is long and requires a large space in the user memory 410. As a consequence, the UID 421 does not fit into the unused user memory 410 anymore, which is shown in the Figure by the "mirror"-entitled blocks that extend over the physical border 415 of the user memory 410. Also the terminator TLV does not fit anymore into the user memory 410 and cannot be appended. There is not enough memory space to produce the NDEF message and no terminator can be added. As a result, providing the NDEF message as a response to a service request will fail.

As a consequence from the examples described above, it becomes evident that providing a cost-efficient tag that is still robust with respect to larger data amounts is still a challenge.

OBJECT AND SUMMARY OF THE INVENTION

It is an object of the invention to provide a method of operating an NFC device which is cost-efficient as well as flexible and robust with respect to data amounts.

In order to achieve the object defined above, a method of operating an NFC device, the NFC device, and a communication system according to the independent claims are provided.

According to an exemplary embodiment of the invention, a method for operating a first near field communication (NFC) device comprising an NFC interface and a memory is provided. The method comprising: i) receiving a request for a service from a second NFC device at the NFC interface, ii) allocating a first information from a first memory unit of the memory, wherein the first memory unit is configured to take part in providing the service (in normal use), iii) allocating a second information from a second memory unit of the memory, wherein the second memory unit is not configured to take part in providing the service (in normal use), and transferring the second information from the second memory unit to the first memory unit, (hereby) iv) transferring at least a part of the first information and/or at least a part of the second information virtually beyond the first memory unit, v) combining the first information and the second information into a message, and vi) providing the message to the second NFC device as a response to the request.

According to another exemplary embodiment of the invention, a first NFC device, in particular being an NFC tag, is provided. The NFC device comprises: i) an NFC interface configured to receive a request for a service from a second NFC device, and transmitting a message, in particular in NDEF format, to the second NFC device in response to the request, ii) a memory, wherein the memory comprises: a first memory unit that is configured to take part in providing the service, and a second memory unit that is not configured to take part in providing the service, and iii) a processing unit configured to a) allocate a first information from the first memory unit, b) allocate a second information from the second memory unit and transferring the second information from the second memory unit to the first memory unit, (hereby) c) transferring at least a part of the first information and/or at least a part of the second information virtually beyond the first memory unit, and d) combine the first information and the second information into the message, in particular NDEF message.

According to another exemplary embodiment of the invention, a communication system is provided. The system comprising: i) a first NFC device as described above, and ii) a second NFC device configured to request a service from the first NFC device and to receive an NDEF message in response to the request. Hereby, the second NFC device is a mobile NFC device, in particular an NFC mobile phone.

In the context of the present application, the term "NFC" may refer to Near Field Communication which may be a short-range wireless technology (distances measured in centimeters) that is optimized for intuitive, easy, and secure communications between various devices without user configuration. In order to make two NFC devices communicate, users may bring them close together or even make them touch. The devices' NFC interfaces may automatically connect and configure themselves to form a peer-to-peer network. NFC may also bootstrap with other protocols, such as Bluetooth or Wireless Ethernet (WiFi), by exchanging configuration and session data. NFC may be compatible with contactless smart card platforms. NFC devices can also operate like a contactless card making them compatible with the huge installed infrastructure of ISO/IEC 14443-compliant systems. In the context of the present application, the term "NFC device" may refer to any device that has an NFC functionality as described above. An NFC interface may for example be implemented in a tag, a smart card, or a mobile phone.

In the context of the present application, the term "memory" may refer to every electronic that is suitable for storing first and second information and that can be configured to be separated in a first memory unit being accessible to a user (and being configured to take part in providing a message in normal use) and a second memory unit being at least partially restricted or in-accessible to a user (or at least not as accessible/controllable as the first memory unit) (or not being configured to take part in providing a message in normal use). The memory may be the memory of an NFC tag and may be a non-volatile EEPROM. There may be one memory separated into units or different memories may be connected or coupled to each other. The memory of the NFC device may be configured and/or formatted in order to obtain i) a first memory unit that is a user memory, wherein the user of the first NFC device (e.g. a vendor, a service provider, a technician) has full access and can store first information such as an URL, and ii) a second memory unit that is a restricted system memory for storing e.g. serialization data.

In the context of the present application, the term "user" may refer to a person or a group of persons that use (apply) an NFC device. A user of a second NFC device, e.g. a mobile phone, may be the user/owner of the NFC mobile phone. She or he may be a customer that requests a service from another NFC device. A user of a first NFC device, e.g. a tag, may be the user/owner of the NFC tag who provides a service via the tag. For example, the user may be a vendor and the tag provides a link to the vendor's web site. Hereby, the user may also be the technician or computer scientist that prepares the first NFC device. The user of the first NFC device may provide the first NFC device to a public location. The user may configure/program the NFC device such that it provides the desired service. When configuring the NFC device, the user may format the NFC device such that there is a first memory with full access to a user (like himself) and a second memory with restricted access to a user (including himself). In another example, the user may purchase an NFC device that is already formatted in the described manner. The user of the first NFC device may have full access to the first memory unit, while the user of the second NFC device may not have access to said first memory unit. Hence, the user of the first NFC device may be different from the user of the second NFC device.

In the context of the present application, the term "transfer virtually beyond" may refer to the circumstance that transferred data (e.g. mirrored data) can grow beyond the physical memory space of the first memory unit. The first memory unit may comprise an unused space, where a first part of second information (a UID, a counter value, or other specifications) may be stored. For example, the second information may be mirrored from a second memory unit to the unused space of the first memory unit. In case that the physical memory space of the first memory unit can, for example, only store a first part of the second information (and the second part of the second information does not fit anymore), it may be allowed by the NFC device to transfer the second part of the second information to grow virtually beyond the physical user memory (the same may be done, for example, with the whole second information or a part of the first information, or both). In this manner, a terminator TLV may be appended to the message (e.g. by a processing part of the NFC device) and the message (i.e. the provision of the service) may still be fully functional, even though there is not enough physical memory available. A virtual transfer beyond the physical memory may include a factory-locked part of the NFC device that may not be part of the physical memory and is not configured to take part in providing the message.

According to an exemplary embodiment, the invention may be based on the idea that a small and therefore cost-efficient memory can be used in an NFC device, even when the NFC device should operate in a flexible and robust manner with respect to data amounts. These effects may be advantageously achieved by storing a first information (being indicative for a service, e.g. an URL) in a first memory unit being accessible by a user (i.e. the memory is configured to take part in providing a service) and by transferring a second information (being indicative for the provider of the NFC device such as a serialization number or a counter) from a second memory unit inaccessible or at least not fully accessible to the user (i.e. the memory is not configured to take part in providing a service) to the first memory unit. While, according to the prior art, there is one user memory with full access for a user for storing all the data needed for providing a message (e.g. URL and UID), it has now been surprisingly found that the operation of an NFC device with respect to the memory space is advantageously improved, when transferring at least a part of the first information and/or of the second information includes, literally spoken, virtually growing beyond the physical memory size (of the first memory unit). In this manner, even very large first information such as long web addresses can be stored in the user-accessible first memory unit without effecting the provision of the service at all. Second information are transferred to the user-accessible first memory unit, however, only up to the point of the border of the physical memory (of the first memory unit). A part of the first information and/or of the second information is then transferred so that said part(s) virtually grow(s) beyond the first memory unit. In said second memory unit, there are generally configuration data and/or serialization data stored and the user is not meant to enter this memory unit. The second memory unit is normally de-coupled from the user activity and does not take part in providing a service such as an NDEF message. In the described manner, the first memory unit (storing the first information) can be efficiently coupled with the second memory unit (storing the second information). Hence, an efficient use of the available physical memory is provided which is not available in the prior art. In the described manner, also a terminator TLV can be efficiently appended in order to provide a valid NDEF message, even so a large data amount (with respect to the web address) is used.

In the following, further exemplary embodiments of the method and the communication system will be explained.

According to an exemplary embodiment, the first NFC device is an NFC tag and the message is in the NFC data exchange format, NDEF. This may provide the advantage that established NFC standards can be directly applied and an NFC tag, inherently having a very small memory space, can still store sufficient data while being cost-efficient.

An electromagnetic field may be used to automatically identify and track an NFC tag (or RFID tag) coupled or attached to an object. The tags may contain electronically-stored information. Passive tags may collect energy from a nearby NFC reader. Active tags may have a local power source (such as a battery) and may operate in a large distance from the NFC reader. Unlike a barcode, the tag does not need to be within the line of sight of the reader, so it may be embedded in the tracked object. A typical NFC frequency would be 13.56 MHz.

NDEF messages provide a standardized method for a reader to communicate with an NFC device. The NDEF message contains multiple records, for example an URL and a UID. At the moment, the NFC standard supports five tag types, all of which support the same NDEF message format.

According to a further exemplary embodiment, the first information is indicative of the service, in particular an internet address. This may provide the advantage that the service can be transmitted in an efficient manner.

In one example, the service may be a link to a specific website, e.g. the website of a vendor that provides a smart poster. In another example, the service may be a link to an (online) ticket issued by a ticket vendor. The service may also be an access code that is provided, when a purchase has been performed. An internet address or uniform resource locator (URL) may hence be provided from a first NFC device to a second NFC device. When the second NFC device is a smart phone with internet access, the user may directly visit the link using said smart phone.

According to a further exemplary embodiment, the second information is indicative of a provider of the first NFC device, in particular serialization data, more in particular a unique identification, UID, number and/or a counter. This may provide the advantage that important information/data are efficiently coupled with the service.

The NFC device may comprise serialization information that is stored in a memory unit that is generally restricted (not configured to take part in providing a service in normal use) to a user. In this manner, the serialization information such as a UID number can be attached to an NDEF message.

In an embodiment, tag authentication (e.g. product authentication) may be done by mirroring the UID and a signature calculated over the UID. For a financial transaction a more complex crypto protocol may be needed. An example may be mirroring the UID and an NFC counter and their cryptographic signature into the NDEF message to do a tag authentication. In this case the NFC counter may act as a kind of challenge that changes. In this manner, the data to be signed and therefore the signature are not constant, so the UID and Signature pairs may not be simply cloned.

A counter may be a simple processing unit that keeps a record of how many times a service has been requested from the NFC device. This information may in particular be relevant for the service provider in order to judge if the service is economical. Furthermore, this information may also be of interest for a user of the service in order to judge if other persons use the service as well, wherein a large amount of requested services may indicate a quality criterion.

According to a further exemplary embodiment, the transfer further comprises mirroring the second information from the second memory unit to the first memory unit and converting the second information from a first data format, in particular hexadecimal or binary, to a second data format, in particular ASCII. This may provide the advantage that the data can be stored in a format that requires less memory space.

For example, the ASCII format, which is generally used in NDEF messages, requires, according to its formatting, the double amount of memory space in comparison to the hexadecimal format or binary format. The second information may hence be stored in the first data format and only, when required, be converted into the second data format. A converter, which may be a simple processing unit, may be configured to convert the data format and combine the second information (such as a UID) with the first information (such as a URL). The converter may also be part of a so-called NFC mirror.

According to a further exemplary embodiment, the first memory unit is a user memory that is accessible to a user, in particular with reading/writing access for a user, and the second memory is a system memory that is at least partially restricted to a user, in particular with only reading access for a user. This may provide the advantage that memory space, which is restricted to a user, can still be efficiently and flexibly used in operating an NFC device, when an accessible memory is coupled to a restricted memory.

The first memory unit is a physical memory and may be a user memory or a part thereof. Hereby, the term "user memory" may refer to the whole memory space that is directly controllable and accessible by the user. In this user memory, the user has reading and writing capabilities and can store all data relevant for a service, e.g. a link to a web site. The term "physical memory" may comprise the user memory and some other parts of the first memory unit which are normally not applied by the user. For example, password data or configuration data may be stored in such a further user memory that is part of the physical memory.

The second memory unit may be a system memory such as an internal memory dedicated to store data such as an UID or system configurations which are normally not accessed by the user. The term "physical memory" may in particular refer to a memory that links directly to physical memory bits. The term "logical memory" may in particular refer to how a memory and the mapping of data records to addresses is presented to the user. When an NFC device such as a tag is formatted, the second memory unit may be configured with its access properties. The second memory unit is hereby configured to be not accessible to a user of the NFC device or at least not fully accessible such as the first memory unit. For example, the user may only have reading capabilities but not writing capabilities. In another example, the user has reading capabilities and restricted writing capabilities (with respect to the first memory unit). In a further embodiment, the user does also not have reading capabilities and the second memory unit is merely accessed by a processing unit of the NFC device.

According to a further exemplary embodiment, the method further comprises appending a terminator TLV, in particular 0xFE, to the NDEF message in order to indicate the end of the NDEF message. This may provide the advantage that a fully functional NDEF message can be provided. In case that there is not enough physical memory space available to append the terminator, the NDEF message may not be valid and the service will fail.

TLV is an abbreviation for three different fields: T for tag field, L for length field and V for value field. A TLV block consists of one or more bytes, depending on which of these three fields is present. The terminator TLV is the last TLV block in the data area, and consists of a single byte: 0xFE. This TLV block may be mandatory in the NDEF format.

According to a further exemplary embodiment, appending is done by a processing part of the first NFC device. This may provide the advantage that the NDEF message is made fully functionable. In particular, that is at least partially restricted to a user.

According to a further exemplary embodiment, the memory is a non-volatile electrically erasable programmable read-only memory, EEPROM. This may provide the advantage that an established, robust, and secure technology can be directly implemented.

According to a further exemplary embodiment, transferring further comprises: i) transferring a first part of the second information into the first memory unit, and ii) transferring a second part of the second information virtually beyond the first memory unit. In this manner, the first part (which fits into the first memory unit) remains in the first memory unit, while the second part (which does not fit into the first memory unit) is virtually grown beyond the first memory unit.

According to a further exemplary embodiment, transferring further comprises: i) keeping a first part of the first information in the first memory unit, and ii) transferring a second part of the first information virtually beyond the first memory unit. The described manner may be in particular feasible, if the second information is not appended to the first information, but is instead inserted into the first information. For example, the first part of the first information (e.g. a first URL) remains in the first memory unit and (at least a part) of the second information also remains in the first memory unit. The second part (or at least a part of the second part) of the first information (e.g. a second URL) is transferred virtually beyond the first memory unit. Hereby, also at least a part of the second information may be transferred virtually beyond the first memory unit.

According to a further exemplary embodiment, combining further comprises: appending the second information to the first information. According to a further exemplary embodiment, combining further comprises: inserting the second information into the first information, in particular between a first part of the first information and a second part of the first information. In this manner, providing the message is more flexible and efficient.

According to a further exemplary embodiment, a service providing unit, in particular a smart poster, comprises the NFC tag as described above. Hereby, the advantageous NFC tag can be used in economically interesting (public) locations.

Smart posters used in advertising can contain an NFC tag (e.g. a near field communication circuit). Each of the NFC tags has a unique identifier (UID) and/or a counter. The NFC tag may contain a URL (e.g. an advertisement for a concert or merchant) that is to be communicated to another NFC device (e.g. an NFC enabled mobile phone) when the NFC device is communicatively coupled with the NFC tag. The NFC tag may merge the UID and/or the counter with the URL (in ASCII coding) into a message that is to be sent from the NFC tag to the NFC mobile phone. Reading the smart poster, including the NFC tag, with an NFC device may send the URL (with the UID and/or the counter) to a back-end system. The UID and/or counter may then be analyzed at the back-end system.

The aspects defined above and further aspects of the invention are apparent from the examples of embodiment to be described hereinafter and are explained with reference to these examples of embodiment. The invention will be described in more detail hereinafter with reference to examples of embodiment but to which the invention is not limited.

BRIEF DESCRIPTION OF THE DRAWINGS

FIG. 3a shows a prior art memory, while FIGS. 3b to 3d illustrate memories according to an exemplary embodiment of the invention.

The illustrations in the drawings are schematic. In different drawings, similar or identical elements are provided with the same reference signs.

DESCRIPTION OF EMBODIMENTS

Figure 1:
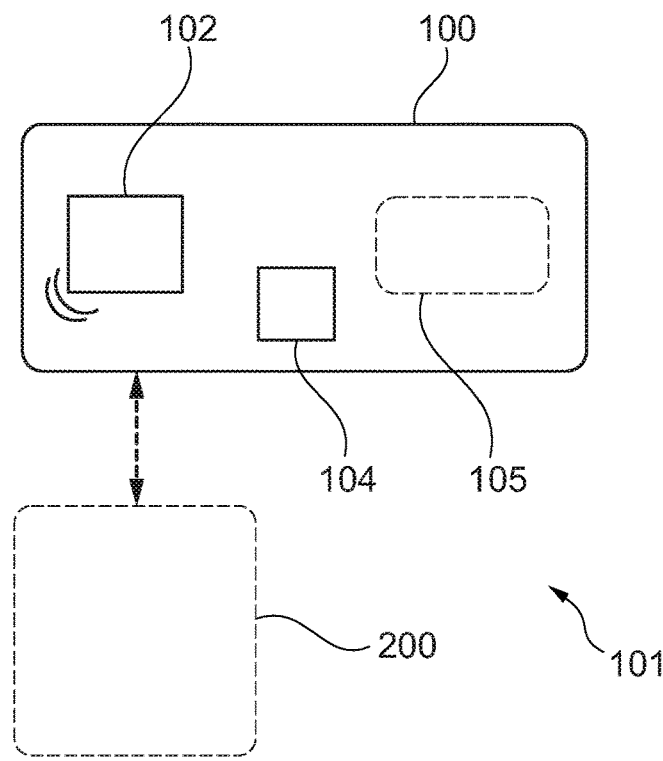
FIG. 1 illustrates a communication system according to an exemplary embodiment of the invention.

Before, referring to the drawings, exemplary embodiments will be described in further detail, some basic considerations will be summarized based on which exemplary embodiments of the invention have been developed.

According to an exemplary embodiment, an NFC tag could store an URL information in NDEF format in the user memory which can be sent to a backend system when an NFC enabled device taps the NFC tag. The NFC mirror is a mechanism to add chip specific serialization data like the UID to the static part of the NDEF message that the customer programs. A big physical memory easily holds the static part of the NDEF message, the NFC mirror data and the terminator TLV. Actually only the static part of the NDEF message needs physical memory (memory unit accessible by a user), the NFC mirror data is stored elsewhere anyway (e.g. in a memory unit restricted to a user). So the physical memory can be much smaller to save costs if the NFC mirror can grow beyond the physical memory size. In most cases the NDEF message needs to be terminated by a terminator TLV in order to be valid.

According to an exemplary embodiment of the invention, the following steps are performed: i) an NFC enabled device (a second NFC device) taps a tag (a first NFC device) and reads the tags memory, ii) the tag processes the read command and returns the data from its memory to the second NFC device, iii) if mirroring (including converting a data format) is enabled, starting at a preconfigured memory address (mirror start address as configured by a user), the tag converts serialization data (e.g. an UID) to ASCII format on the fly and sends this mirror data to the second NFC device (e.g.: www.nxp.com/2334567786127880), and iv) when the second NFC device is connected to internet, it sends the mirror information (e.g. UID or an NFC counter value) to a backend system.

According to an exemplary embodiment, while in the prior art in case the NFC mirror extends beyond the physical user memory, the terminator TLV cannot be appended by the user because there is no writeable memory, the invention overcomes this limitation by allowing the chip to append the terminator TLV to indicate the end of the NDEF message.

According to an exemplary embodiment, the NFC mirror can grow beyond the physically available memory and an option is provided to add a terminator TLV to terminate the NDEF properly. The invention allows flexibility to the user to configure an arbitrary mirror start address within the specified NDEF area and virtually growing NFC mirror area beyond physical memory.

According to an exemplary embodiment, the second information could consist of one or more information parts (e.g. UID, Counter, Signature, Terminator TLV).

According to an exemplary embodiment, the second information is not appended to the first information but is instead inserted into the first information. For example, the UID and/or the counter are mirrored between a first part of the first information (e.g. first URL) and a second part of the first information (e.g. second URL). In this manner, combining the first information and the second information is made very flexible and hence efficient. In this specific embodiment, also (at least) a part of the first information can be allowed to grow virtually beyond the first memory unit. This could be done in a static manner: the logical user memory (first memory) is grown by the maximum size of the NFC mirror and this region is defined factory locked (the maximum needed size of the user memory may be "physical user memory size"+"maximum NFC mirror size"+"padding for full multiple of memory granularity", e.g. double words=4 byte). Then, the NFC mirror and the second part of the first information can virtually grow in said region. Alternatively, this could be done in a dynamic manner: the logical user memory is grown depending on the space required by the NFC mirror.

FIG. 1 illustrates an embodiment of a communication system 101 comprising a first NFC device 100 and a second NFC device 200. The first NFC device 100 is an NFC tag (RFID tag) comprising an NFC interface 102 with an antenna and a memory 105. Furthermore, the first NFC device 100 comprises a processing unit 104 which is integrated with the memory 105 or can be a separate structure. The second NFC device 200 is a mobile NFC phone. The NFC interface 102 is configured to receive a request for a service from the second NFC device 200. Furthermore, the NFC interface 102 is configured to provide a message 160 in NDEF format to the second NFC device 200 in response to the request. Hereby, the first NFC device 100 can be a part of a smart poster that offers a service and the user of the second NFC device 200 can obtain a link to the service provider via the message 160.

Figure 2:
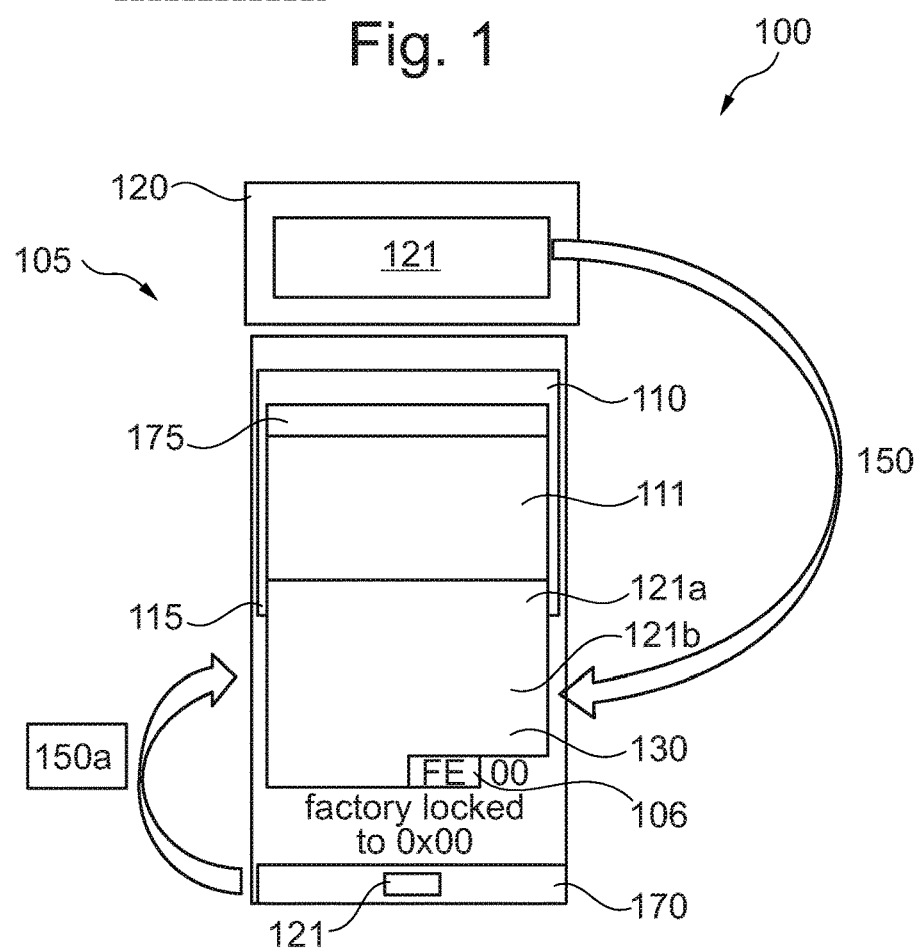
FIG. 2 illustrates a memory according to an exemplary embodiment of the invention.
Figure 4A:
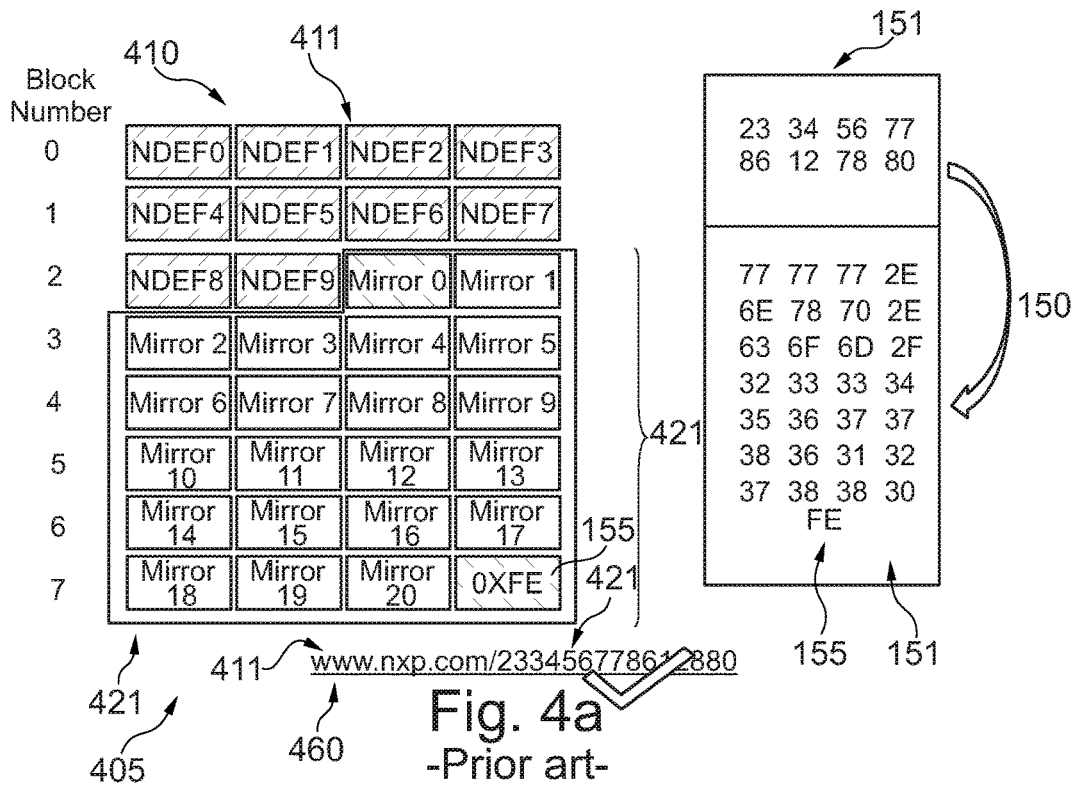
FIGS. 4a and 4b show methods of operating an NFC device according to prior art examples.
Figure 4B:
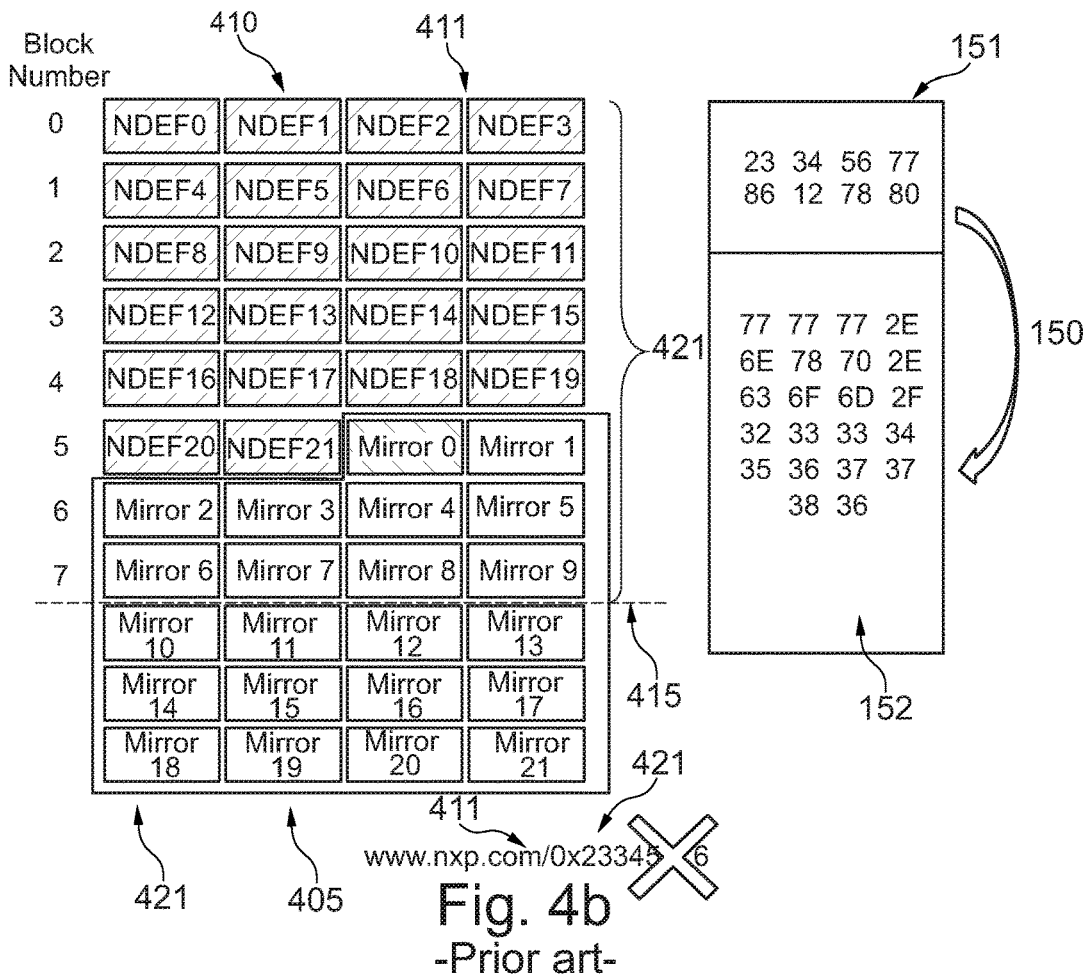

FIG. 2 illustrates an embodiment of the memory 105 of the NFC device 100. The memory 105 is a non-volatile EEPROM with a size of e.g. 2 kbit. The memory 105 has a first memory unit 110 which is accessible to a user (the user of the first NFC device such as the provider, not the user of the second NFC device) and normally takes part in providing the service. Hence, the user of the first NFC device has control over this first memory unit 110, e.g. by having reading and writing capabilities. The user can store first information 111 being indicative for a service in the first memory unit 110. For example, a web address (URL) is stored as the first information 111. The first memory unit 110 also contains NFC information data (capability container) 175. For example, when a tag is formatted as an NFC tag, the first 4 to 8 bytes contain the so-called capability container—this stores the following information: version, access conditions, length of memory allocated for NFC, further features. The memory space of the first memory unit is restricted (for example to 1 kbit) and its limitation is shown graphically as a physical memory border 115. The memory 105 optionally comprises a counter 170 that can be a small processing unit which keeps track of how many times a service has been requested at the NFC device 100. The memory 105 furthermore comprises a second memory unit 120 which is not configured to take part in providing the service. The second memory unit 120 can store second information 121 which is indicative for a provider of the first NFC device 100. For example, the second information 121 comprises the UID of the first NFC device 100 or other/further serialization data. In another example, the second information 121 comprises the counter value 170. The first memory unit 110 and the second memory unit 120 can be coupled, in particular linked, in the user memory 105. The second memory unit 120 is configured to transfer the second information 121 to unused memory space of the first memory unit 110 in case that the service (providing a message) is requested. Hereby, the second information 121 is mirrored, using an NFC mirror 150, from the second memory unit 120 to the first memory unit 110. Additionally or alternatively, further second information 121 is mirrored, using the same or another NFC mirror 151a, from the counter 170 (which is part of the first memory unit 110 or located elsewhere in the physical memory) to the first memory unit 110. A first part of the second information 121a fits into the unused memory space of the first memory unit 110, while a second part of the second information 121b is virtually transferred 130 beyond the first memory unit 110. The virtual transfer 130 may include a factory locked memory space 180 of the NFC device 100. Furthermore, the NFC device 100 comprises a processing unit part 106 that can append a terminator TLV to the NDEF message 160 (even though the second information does not fully fit into the first memory unit 110). The user has hereby the possibility to enable or disable the appending of the terminator TLV.

FIG. 3b shows an example of a physical view of the memory configuration of an NFC tag 100 according to the invention. The physical memory 105 is very similar to the one described in FIG. 3a above. However, there is an additional factory locked part 180 that is generally restricted to the user and/or does not take part in providing a service.

FIG. 3c shows a logical view of the first memory unit 110. The first memory unit comprises a CC 175, a space for storing the first information (e.g. the URL) 111 and an unused memory space 112 for storing mirrored second information. There is a factory locked part 180 that is generally restricted to the user and/or does not take part in providing a service.

FIG. 3d shows the first memory unit 110 from FIG. 3c with the difference that the NFC mirror 150 has mirrored the second information 121 from the second memory unit 120 (not shown, see FIG. 2) to the first memory unit 110. In the example shown, the second information 121 contains an UID and a counter value. Hereby, a first part 121a of the second information 121 fits into the unused memory space 112 of the first memory unit 110. A second part 121b of the second information 121 does not fit into said unused memory space 112 and is allowed to virtually grow 130 beyond the first memory unit 110. In this manner, the terminator TLV 155 can be appended and the message is fully functional. The virtual transfer 130 may include a factory locked part 180 of the first memory unit 110.

Figure 5:
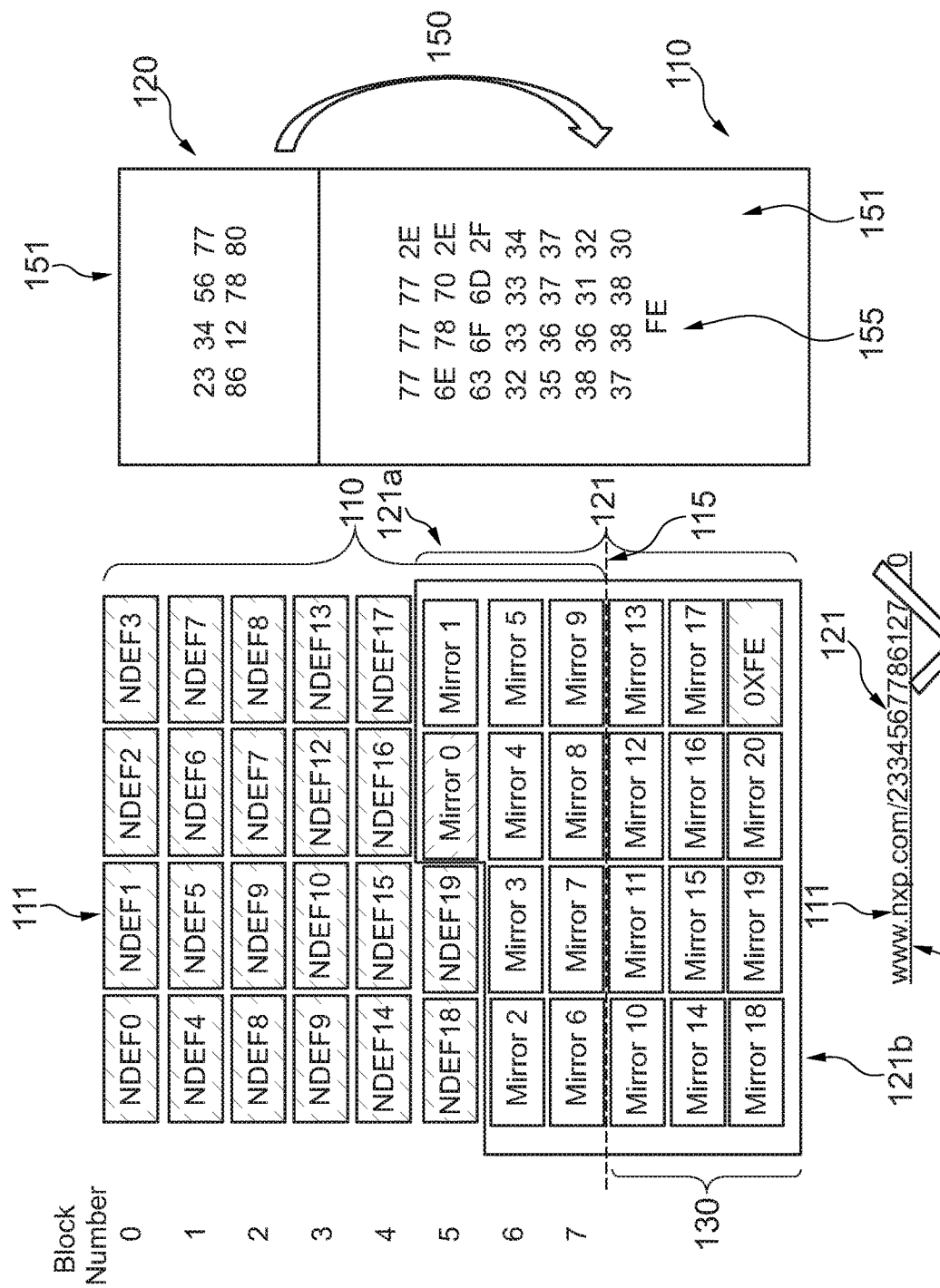
FIG. 5 illustrates a method of operating an NFC device according to an exemplary embodiment of the invention.

FIG. 5 illustrates a method for operating a first near field communication, NFC, device 100 according to an exemplary embodiment of the invention. The NFC device 100 receives a request for a service from a second NFC device 200 at the NFC interface 102. Then, a first information 111 is allocated from a first memory unit 110 of the memory 105 that is accessible to a user (shown as "NDEF plus number" blocks) of the first NFC device 100. A second information 121 is allocated which comprises: transferring (mirroring) a first part of the second information 121a from the second memory unit 120 to the first memory unit 110, and transferring a second part of the second information 121b from the second memory unit 120 virtually beyond 130 the first memory unit 110. This is because the first memory unit 110 only has the capacity to store the first part of the second information 121a. The second part 121b extends over the physical memory border 115. The second information 121 are then combined with the first information 111 into an NDEF message 160. The terminator TLV 155 is also appended (e.g. by a processing unit part 106) and the NDEF message 160 can be provided to the second NFC device 200 as a response to the request, even though a very long web address is used as the first information 111.

Figure 6A:
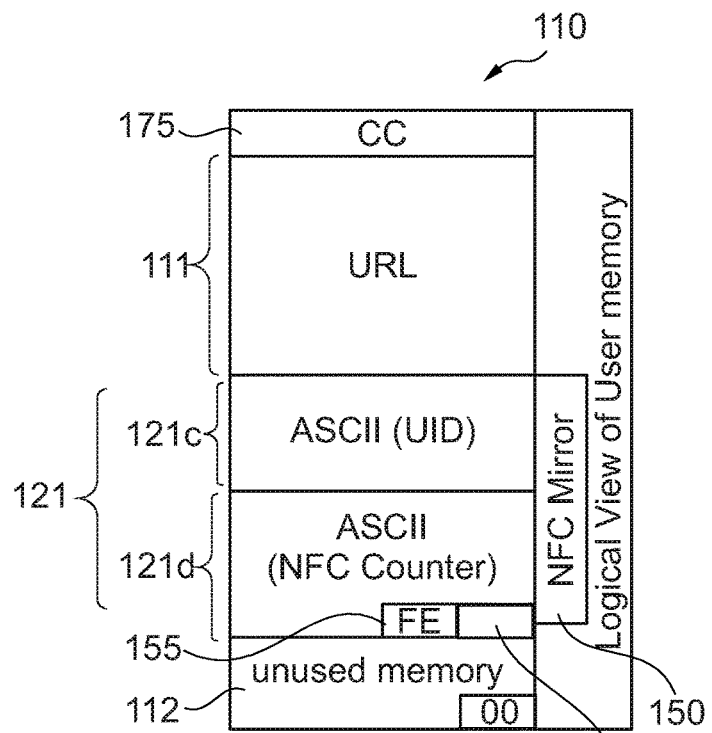
FIGS. 6a and 6b illustrate memories according to further exemplary embodiments of the invention.

FIG. 6a shows the first memory unit 110 from FIG. 3c with the difference that the NFC mirror 150 is not attached to the URL 111 as described in the previous examples. In the exemplar embodiment of FIG. 6a, the NFC mirror 150 is instead inserted into the first memory 110. This results for example in the following structure: URL 111, mirror UID 121c, mirror counter 121d, and unused memory 112. Also the terminator TLV 155 is included in this manner.

Figure 6B:
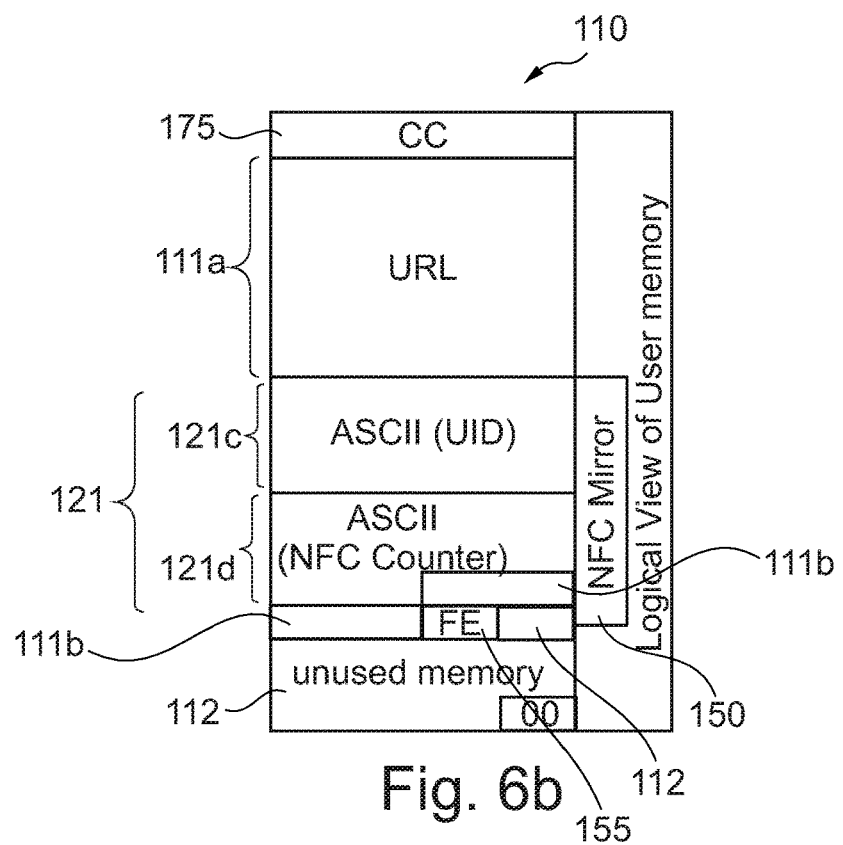

FIG. 6b shows the first memory unit 110 from FIG. 6a with the difference that a part of the unused memory 112 of FIG. 6b is used to insert a second (URL) part 111b of the first information 111 and a terminator TLV 155 which is programmed by the user and which is not mirrored. This results for example in the following structure: first part of first information 111a (URL 1), mirror UID 121c, mirror counter 121d, second part of first information 111b (URL 2), terminator TLV 155, unused memory 112. In this example, the mirror UID 121c and the mirror counter 121d correspond to the second information 121.

REFERENCE NUMERALS

100 First NFC device
101 Communication system
102 NFC interface
104 Processing unit
105 Memory
106 Processing unit part
110 First memory unit
111 First information
111a First information first part
111b First information second part
112 Unused memory space
115 Memory border
120 Second memory unit
121 Second information
121a Second information first part
121b Second information second part
121c Mirror UID
121d Mirror counter
130 Virtual transfer
150, 150a Converter (NFC mirror)
151 First data format
152 Second data format
155 Terminator TLV
160 NDEF message
170 Counter
175 Internal data (capability container)
180 Factory locked part
200 Second NFC device
305, 405 Prior art memory
310, 410 Prior art user memory
311, 411 Prior art URL
312 Prior art further user memory
321, 421 Prior art UID
415 Prior art memory border
460 Prior art message

The invention claimed is:

1. A method for operating a first near field communication, NFC, device, wherein the NFC device comprises an NFC interface and a memory, the method comprising:

receiving a request for a service from a second NFC device at the NFC interface;

allocating a first information from a first memory unit of the memory, wherein the first memory unit is configured to take part in providing the service;

allocating a second information from a second memory unit of the memory, wherein the second memory unit is not configured to take part in providing the service, and transferring the second information from the second memory unit to the first memory unit; hereby transferring at least a part of the first information and/or at least a part of the second information virtually beyond the first memory unit;

combining the first information and the second information into a message; and providing the message to the second NFC device as a response to the request.

2. The method according to claim 1,
wherein the first NFC device is an NFC tag and wherein the message is in the NFC data exchange format, NDEF.

3. The method according to claim 1,
wherein the first information is indicative of the service, in particular an internet address.

4. The method according to claim 1,
wherein the second information is indicative of a provider of the first NFC device, in particular serialization data, more in particular a unique identification, UID, number and/or a counter.

5. The method according to claim 1, wherein transferring comprises:
mirroring the second information from the second memory unit to the first memory unit; and
converting the second information from a first data format, in particular hexadecimal, to a second data format, in particular ASCII.

6. The method according to claim 1,
wherein the first memory unit-is a user memory that is accessible to a user, in particular with reading/writing access for a user;
wherein the second memory is a system memory that is at least partially restricted to a user, in particular with only reading access for a user.

7. The method according to claim 2, further comprising:
appending a terminator TLV (tag, length, value) field to the NDEF message in order to indicate the end of the NDEF message, more in particular wherein appending is done by a processing part of the first NFC device.

8. The method according to claim 1,
wherein transferring further comprises:
transferring a first part of the second information into the first memory unit; and
transferring a second part of the second information virtually beyond the first memory unit.

9. The method according to claim 1,
wherein transferring further comprises:
keeping a first part of the first information in the first memory unit; and
transferring a second part of the first information virtually beyond the first memory unit.

10. The method according to claim 1,
wherein combining further comprises:
appending the second information to the first information;
or
inserting the second information into the first information, in particular between a first part of the first information and a second part of the first information.

11. A first NFC device being an NFC tag, comprising:
an NFC interface configured to
receive a request for a service from a second NFC device, and
transmitting a message in NDEF format to the second NFC device in response to the request;
a memory, wherein the memory comprises:
a first memory unit that is configured to take part in providing the service, and
a second memory unit that is not configured to take part in providing the service; and
a processing unit configured to
allocate a first information from the first memory unit,
allocate a second information from the second memory unit and transfer the second information from the second memory unit to the first memory unit, hereby
transfer at least a part of the first information and/or at least a part of the second information virtually beyond the first memory unit, and
combine the first information and the second information into the NDEF message.

12. The NFC device according to claim 11, further comprising:
a converter, in particular an NFC mirror, configured to mirror the second information from the second memory unit to the first memory unit and to convert the second information from a first data format, in particular hexadecimal, to a second data format, in particular ASCII.

13. The NFC device according to claim 11, further comprising
a processing part that is configured to append a terminator TLV (tag, length, value) field to the NDEF message in order to indicate the end of the NDEF message.

14. A communication system, comprising:
a first NFC device according to any one of the claim 11; and
a second NFC device, configured to request a service from the first NFC device and to receive an NDEF message in response to the request,
wherein the second NFC device is a mobile NFC device, in particular an NFC mobile phone.

15. A service providing unit, in particular a smart product, comprising the NFC tag according to claim 11.

* * * * *